US010015214B2

(12) United States Patent
Priya

(10) Patent No.: US 10,015,214 B2
(45) Date of Patent: Jul. 3, 2018

(54) METHOD AND APPARATUS FOR SHARING VIEWABLE CONTENT WITH CONFERENCE PARTICIPANTS THROUGH AUTOMATED IDENTIFICATION OF CONTENT TO BE SHARED

(71) Applicant: Adobe Systems Incorporated, San Jose, CA (US)

(72) Inventor: Bhaskar Priya, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 213 days.

(21) Appl. No.: 14/501,953

(22) Filed: Sep. 30, 2014

(65) Prior Publication Data

US 2016/0094593 A1 Mar. 31, 2016

(51) Int. Cl.
*G06F 15/16* (2006.01)
*H04L 29/06* (2006.01)
*H04L 29/08* (2006.01)
*G09B 5/00* (2006.01)
*H04N 21/00* (2011.01)
*G06Q 10/10* (2012.01)

(52) U.S. Cl.
CPC .......... *H04L 65/403* (2013.01); *G06Q 10/10* (2013.01); *G09B 5/00* (2013.01); *H04L 67/02* (2013.01); *H04N 21/00* (2013.01)

(58) Field of Classification Search
CPC ..... H04L 65/403; H04L 67/02; G06F 3/0482; G06Q 30/02; G06Q 10/10
USPC ........................................................ 709/204
See application file for complete search history.

(56) References Cited

U.S. PATENT DOCUMENTS

| 6,317,777 | B1 * | 11/2001 | Skarbo | G06F 17/30887 348/E7.083 |
| 7,353,252 | B1 * | 4/2008 | Yang | G06Q 10/10 709/204 |
| 8,280,948 | B1 * | 10/2012 | Chen | H04N 21/4402 709/203 |
| 8,769,006 | B2 * | 7/2014 | Davidson | G06Q 10/10 709/204 |
| 2012/0133727 | A1 * | 5/2012 | Bolduc | H04N 7/152 348/14.07 |
| 2014/0194066 | A1 * | 7/2014 | Li | G06F 3/1446 455/41.3 |
| 2015/0032809 | A1 * | 1/2015 | Xie | H04L 65/1083 709/204 |

(Continued)

*Primary Examiner* — Tauqir Hussain
(74) *Attorney, Agent, or Firm* — Keller Jolley Preece

(57) ABSTRACT

A computer implemented method and apparatus for sharing the contents of a presentation in a web conference through automated identification of documents for selective sharing with web conferences comprises launching a web conference in which an application or an entire desktop view of a conference presenter is caused to be rendered as content viewable on the displays of all conference participants. The method detects that one or more documents are being accessed by application(s) executed concurrently with the desktop sharing application and identifies documents having a supported format as including viewable content available for rendering to the display of the presenter. Automatically, or after presenter confirmation, the content is uploaded to a web server and converted into a format that can be distributed to and cached at the respective participant computers.

20 Claims, 11 Drawing Sheets

(56) References Cited

U.S. PATENT DOCUMENTS

2015/0148093 A1\* 5/2015 Huang .............. H04W 52/0225
455/522

\* cited by examiner

|  MEETING | PRESENT | LAYOUTS | PODS | HELP |

CAMERA & VOICE

ATTENDEE LIST

NOTE

CURRENT DOC:
☐ DESKTOP VIEW
☐ PRESENTATION.PPT
☒ MARKET SHARE.PDF
☐ CASH FLOW 2014.XLS

2014 - MARKET SHARE

|        | 1st QTR | 2nd QTR | 3rd QTR | 4th QTR |
|--------|---------|---------|---------|---------|
| EAST   | 33.3    | 28.0    | 23.2    | 20.0    |
| CENTRAL| 26.7    | 24.5    | 24.0    | 25.0    |
| WEST   | 40.5    | 43.5    | 41.5    | 38.7    |
| SOUTH  | 11.4    | 12.5    | 13.3    | 14.4    |

2014 - MARKET SHARE

|        | 1st QTR | 2nd QTR | 3rd QTR | 4th QTR |
|--------|---------|---------|---------|---------|
| EAST   | 33.3    | 28.0    | 23.2    | 20.0    |
| CENTRAL| 26.7    | 24.5    | 24.0    | 25.0    |
| WEST   | 40.5    | 43.5    | 41.5    | 38.7    |
| SOUTH  | 11.4    | 12.5    | 13.3    | 14.4    |

METHOD AND APPARATUS FOR SHARING VIEWABLE CONTENT WITH CONFERENCE PARTICIPANTS THROUGH AUTOMATED IDENTIFICATION OF CONTENT TO BE SHARED

BACKGROUND OF THE INVENTION

Field of the Invention

Embodiments generally relate to online and web conferencing meetings and, more particularly, to sharing the contents of presentations with conference participants during the course of such meetings.

Description of the Related Art

The costs associated with travel have increased substantially over time. This trend, and the widespread availability of high-speed Internet access, has led many institutions to move their meetings, conferences and video presentations online. A typical use case for web-based tools such as Adobe® Connect™ from ADOBE Systems Incorporated involves a presentation wherein one or more people (referred to herein as "hosts") organize an online interaction, and one or more people present a presentation containing content to a number of interested people (referred to herein as "invited participants" or, simply, "participants"). The online interaction may be a meeting, collaboration, webinar, pre-recorded video, or any other form of multiparty interaction on the web. As used herein, the term "online meeting" is meant to signify any type of multi-party interaction with content delivered over the web whether "live" or generated ahead of time (e.g., a pre-recorded video).

A presenter in a web conference has several options when it comes to the manner in which viewable content is distributed to participants during an online meeting. The most efficient and bandwidth-efficient technique is to share the document itself, as by uploading a document to a server prior to commencing the conference. In practice, however, the inventor has observed that most presenters tend toward sharing his or her entire desktop view with the other participants, which requires much more data to be exchanged between the server and meeting participants.

Therefore, a need exists for improved methods and apparatus for simplifying the process of document sharing in a web conferencing environment.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for sharing viewable content with one or more conference or meeting participants through automated identification of content to be shared, is described. A computer implemented method according to one embodiment comprises receiving a request from a first participant using a first display device, to share content with at least a second participant having viewable access to a display of a second display device. The method further comprises determining whether a first mode of content sharing is applicable to the received request. If content sharing according to the first mode is applicable, the method further comprises initiating transfer of at least one document from a storage location accessible to the first display device, and initiating display, of a portion of the transferred document to the second participant. If content sharing according to the first mode is not applicable, the method further includes initiating display, of the content requested for sharing, to the second participant according to a second mode of content sharing.

In another embodiment, a system for sharing viewable content with one or more conference or meeting participants through automated identification of content is described. The system comprises a memory and at least one processor coupled to the memory. The at least one processor is configured to execute instructions stored in the memory for receiving a request, from a first participant, to share content with at least a second participant having viewable access to a display. The at least one processor is further configured to execute instructions for determining whether or not content requested for sharing includes at least one document in a format applicable to a first mode of content sharing. If the content requested for sharing is determined to include a document in a format applicable to the first mode of content sharing, the at least one processor is configured to execute instructions for initiating transfer of the at least one document from a storage location associated with the first participant, and for initiating display of a portion of the at least one document to the second participant according to the first mode of content sharing. If the content requested for sharing is determined not to include a document in a format applicable to the first mode of content sharing, the processor is configured to execute instructions for initiating display of the content requested for sharing to the second participant according to a second mode of content sharing.

In another embodiment, a computer readable medium for sharing viewable content with one or more participants in an online meeting or conference is described. The computer readable medium stores computer instructions that, when executed by at least one processor causes the at least one processor to perform the method for sharing viewable content with one or more conference or meeting participants through automated identification of content to be shared.

BRIEF DESCRIPTION OF THE DRAWINGS

FIGS. 5B-5G depicts a flow diagram of a method for sharing viewable content according to a further embodiment.

Figure 1:
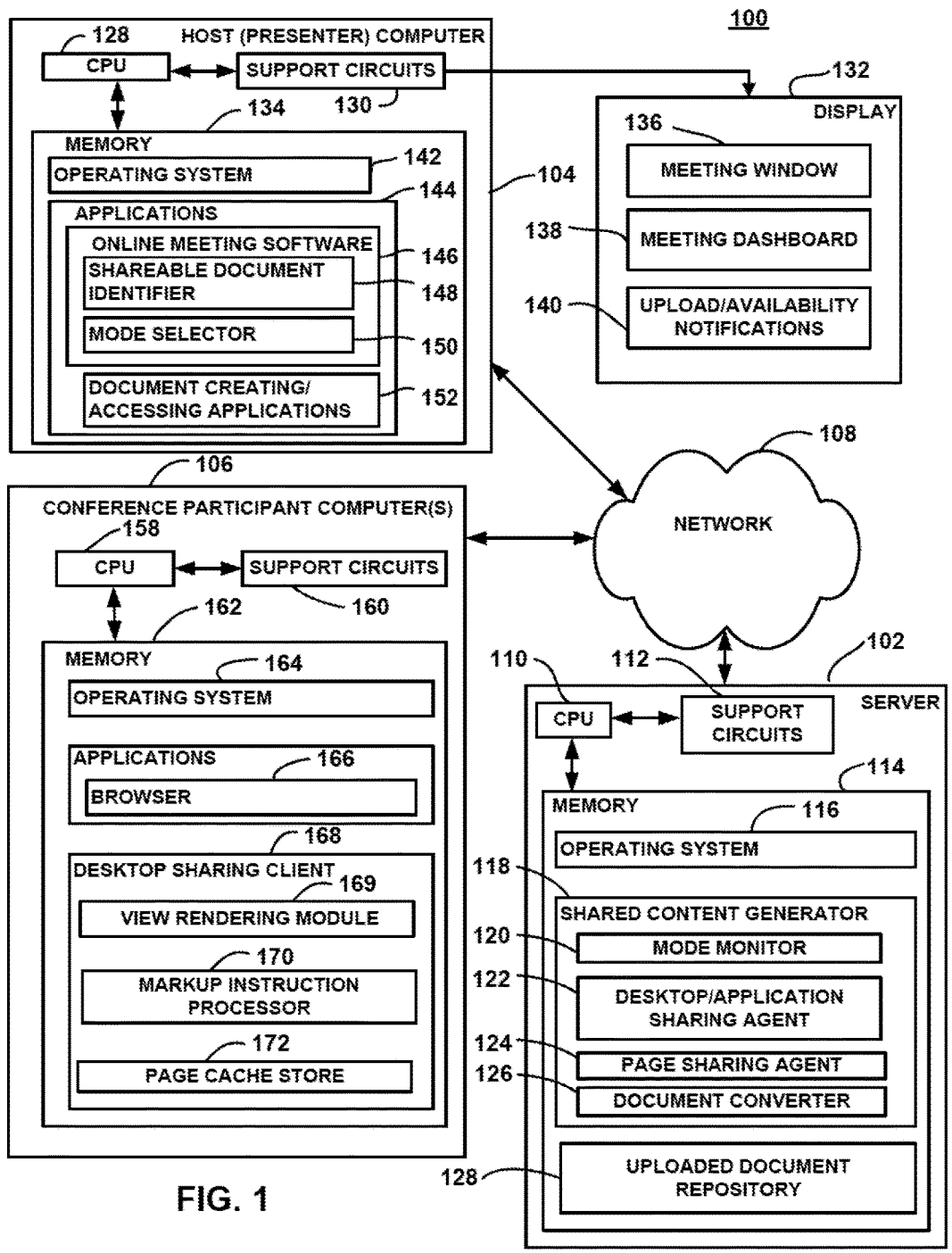
FIG. 1 is a block diagram of a system for sharing viewable content with conference participants through automated identification of content to be shared, according to one or more embodiments.

While the method and apparatus is described herein by way of example for several embodiments and illustrative drawings, those skilled in the art will recognize that the method and apparatus for sharing viewable content with conference participants through automated identification of content to be shared is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for sharing viewable content with conference participants through automated identification of content to be shared defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for sharing the contents of a presentation in a web conference includes launching a web conference. The method detects that one or more documents are being accessed and/or displayed by application(s) executed concurrently with the content sharing application. Those documents having a supported format are automatically identified as including viewable content available for rendering to the display of the presenter. Automatically, or after presenter confirmation, the content is uploaded to a web server and converted into a format that can be distributed to and cached at the respective participant computers.

Online meetings are typically organized by a host, and can be attended by a potentially large number of geographically dispersed participants. Though online meetings are often intended to be interactive, one or more presenters are often scheduled to present information to the participants in an organized fashion. During a presentation, the participants may listen to the presenter speaking at the same time as they are viewing a slide presentation or video on the display of their computer. The computer used by each participant, host and presenter may be a desktop, notebook, laptop, or tablet computer or even a smartphone or wearable computer. An issue that can have a deleterious effect on the experience of conference participants is the failure, on the part of the presenter, to make the most efficient use of the capabilities of a viewable content sharing program. Specifically, when the presenter fails to upload those documents which will be presented and/or discussed during an online meeting, he or she has implicitly decided to continuously transmit a frame-by-frame instantiation of his or her desktop or application view to the other participants via the conference server. Not only does this consume greater bandwidth resources of the network(s) to which the participants are attached, but it can slow the process of screen updates substantially and noticeably.

Embodiments described herein perform an automated identification process, wherein applications executing currently with the viewable content sharing application are identified automatically (i.e., without user involvement). During a single presentation, a presenter may have several applications running at the same time. These may include a word processor program, a spreadsheet program, and a slide presentation program. If only one application is executing and being shared, the document format and file path is determined and the document can be automatically uploaded to a conference server without user input. In some embodiments, however, the user is presented with a list of identified documents and given the option which should be uploaded. In many cases, the documents are in a format not "consumable" by the shared content client application being executed by the processor of each participant computer. The term consumable simply means that the original file format of the uploaded document is not one which can simply be forwarded to the client application of each participant computer for local rendering of the shared display content. In such case, a conversion is performed at the server. The content needed for local display to the participants is extracted from the document, converted to the appropriate format, and transmitted to the participant computers as a screen image to be displayed and/or cached. As such, the participant computers are spared the necessity of frame-by-frame processing of the presenter's desktop view, and a high level of performance and user satisfaction can be maintained throughout a conference.

Various embodiments of a method and apparatus for sharing viewable content with conference participants through automated identification of content to be shared are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for sharing the contents of a presentation in a web conference, according to one or more embodiments. The system 100 comprises a server 102, a host computer 104, and at least one participant computer 106. The server 102, host computer 104 and participant computer(s) 106 are connected via a network 108.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like. In some embodiments, the network 108 includes one or more networks including but not limited to Local Area Networks (LANs) (e.g., an Ethernet or corporate network), Wide Area Networks (WANs) (e.g., the Internet), wireless data networks, some other electronic data network, or some combination thereof.

The server 102 is a computing device, for example a desktop computer, laptop, tablet computer, and the like or the server 102 may be a cloud based server e.g., a blade server, virtual machine, and the like. The server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, and a shared content generator 118 that includes a mode monitor 120, a desktop/application sharing agent 122, a page/document sharing agent 124, and a document converter 126. Memory 114 also includes an uploaded document repository 128 acquired over the entire timeline of the online meeting. Mode monitor 120 tracks, with respect to time, whether or not the presenter is presently conducting the conference in a desktop or application sharing mode or whether the presenter is conducting the conference in a document sharing mode. In some embodiments, and as will be described in greater detail, the presenter transitions from a desktop/application sharing mode into a document sharing mode. In an embodiment, the document sharing mode is entered when the user responds to a system-generated prompt by agreeing to upload one or more documents identified as being open on his or her desktop. If the prompt is generated and responded to while a web conference according to the desktop/application sharing mode is already in progress, a transition into the document sharing mode occurs. The operating system 116 may include various commercially known operating systems.

During the portion of a conference when presentation materials are being shared with participants via the desktop/application sharing mode, sharing agent 122 receives updates from the host computer 104 as to the content being currently rendered to the desktop of the presenter/host, and supplies frame-by-frame updates to the participant computers 106 for rendering to the respective displays (not shown) thereof. During that portion of a conference when presentation materials are being shared with participants via the document sharing mode, the page sharing agent 124 receives updates from the host computer 104 as to the page of a document being rendered to his or her document. Document converter 126 converts the format of the document into something which can be processed by the client application executing on each of the client computers, as will be described shortly. Page sharing agent 124 extracts the portion of the converted document needed for display at a given point during the conference or, if the page to be viewed next is one which has already been sent to the participants, then instructions to retrieve and display a cached page and, optionally, to modify that cached page, are sent by page sharing agent 124.

The host computer 104 is a type of computing device (e.g., a laptop, a desktop, a Personal Digital Assistant (PDA) and/or the like). The host computer 104 comprises a CPU 128, support circuits 130, a display 132, and a memory 134. The CPU 128 may comprise one or more commercially available microprocessors or microcontrollers that facilitate data processing and storage. The various support circuits 130 facilitate the operation of the CPU 128 and include one or more clock circuits, for example a meeting timer, power supplies, cache, input/output circuits, displays, and the like. The display 132 is configurable, responsive to input received from support circuits 130, to display a meeting window 136, a meeting dashboard 138, and shareable document upload prompts, confirmations and/or notifications. The memory 134 comprises at least one of Read Only Memory (ROM), Random Access Memory (RAM), disk drive storage, optical storage, removable storage and/or the like. The memory 134 comprises an operating system 142 and a plurality of applications such as online meeting software 146, which includes a shareable document identifier 148, and a mode selector 150, as well as one or more document creating/accessing applications 152 configured to execute concurrently with the online meeting software so as to cause one or more documents to be displayed to the presenter/host display 132.

With continuing reference to the illustrative embodiment of FIG. 1, the operating system 142 of host computer 104 generally manages various computer resources (e.g., network resources, file processors, and/or the like). The operating system 142 is configured to execute operations on one or more hardware and/or software modules, such as Network Interface Cards (NICs), hard disks, virtualization layers, firewalls and/or the like. Examples of the operating system 120 may include, but are not limited to, Linux, Mac OSX, BSD, UNIX, Microsoft Windows, and the like. The online meeting software 122 may be any online meeting software such as ADOBE® CONNECT™ available from ADOBE Systems Incorporated, San Jose, Calif., capable of connecting participants over a network.

The participant computer 106 is a type of computing device (e.g., a laptop, a desktop, a Personal Digital Assistant (FDA) and/or the like). The participant computer 106 comprises a CPU 158, support circuits 160, and a memory 162. The CPU 158 may comprise one or more commercially available microprocessors or microcontrollers that facilitate data processing and storage. The various support circuits 160 facilitate the operation of the CPU 158 and include one or more clock circuits, for example a meeting timer, power supplies, cache, input/output circuits, displays, and the like. The memory 162 comprises at least one of Read Only Memory (ROM), Random Access Memory (RAM), disk drive storage, optical storage, removable storage and/or the like. The memory 162 comprises an operating system 164, and a browser 166, as well as a desktop sharing client application which includes a view rendering module 169, a markup instruction processor 170, and a page cache store.

Figure 2A:
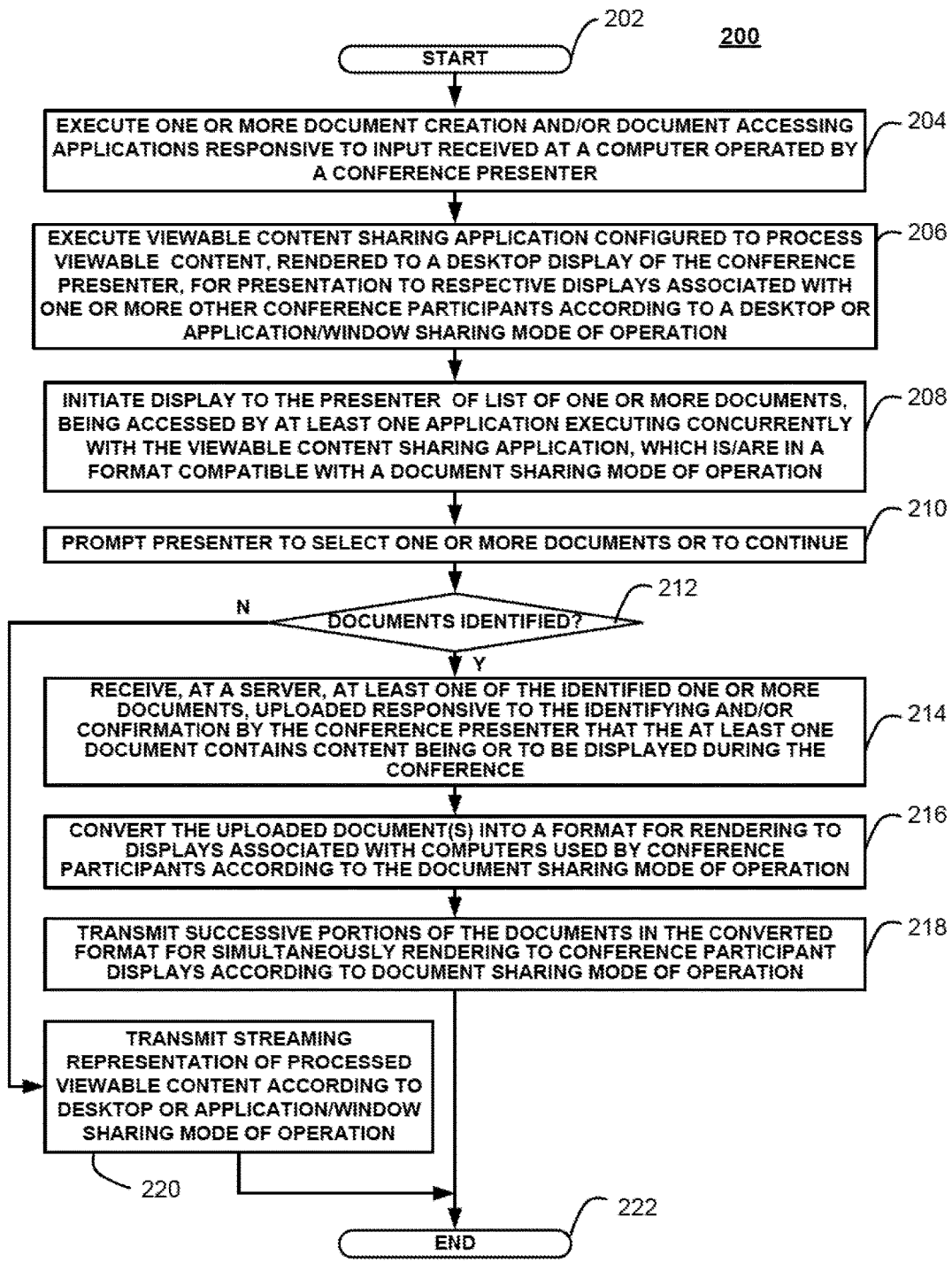
FIG. 2A depicts a flow diagram of a method for sharing viewable content with conference participants through automated identification of content to be shared, according to one or more embodiments.

FIG. 2A depicts a flow diagram of a method 200 for sharing viewable content with conference participants through automated identification of content to be shared, according to one or more embodiments. The method is entered at step 202 and proceeds to step 204. At step 204, a conference presenter or host launches one or more document creation and/or accessing applications using a computer. The method then proceeds to step 206.

At step 206, the method 200 detects execution, by a processor of the presenter's computer, of a viewable content sharing application. The viewable content sharing application is configured to selectively present content rendered to a conference host/presenter desktop as viewable content for concurrent rendering to respective displays associated with one or more other conference participants.

It will, of course, be readily appreciated by those skilled in the art that the order in steps 204 and 206 may be reversed without departing from the spirit and scope of the invention disclosed herein. Thus, in some embodiments, the method 200 detects execution of a viewable content sharing application configured to selectively present content rendered to a conference host/presenter desktop as viewable content for concurrent rendering to respective displays associated with one or more other conference participants. Responsive to such execution, method 200 begins monitoring to determine whether and/or when the user launches one or more document creation and/or accessing applications. If the determination is made that such a launch has occurred, and execution of the viewable content sharing application is detected according to steps 204 and 206, the method proceeds to step 208.

At step 208, the method identifies one or more documents as being accessed and/or opened by one or more corresponding application(s) executed by the processor. In an embodiment, the identification of one or more document(s) being accessed by the application(s) is triggered by launch of the content sharing application. Alternatively, or in addition, launching of a new application—subsequent to launch of the content sharing application—to access the one or more documents, can also trigger the identification. As the result such identification, the document name and file path are identified. The method then proceeds to step 210. At step 210, the method uploads, to a server, at least one of the identified documents responsive to the identifying. Optionally, the uploading may be preceded by a step of prompting the host/presenter to confirm that the identified document(s) are being presented as, or intended for presentation as, part of the materials shared during the conference. The method then proceeds to step 212.

Figure 2B:
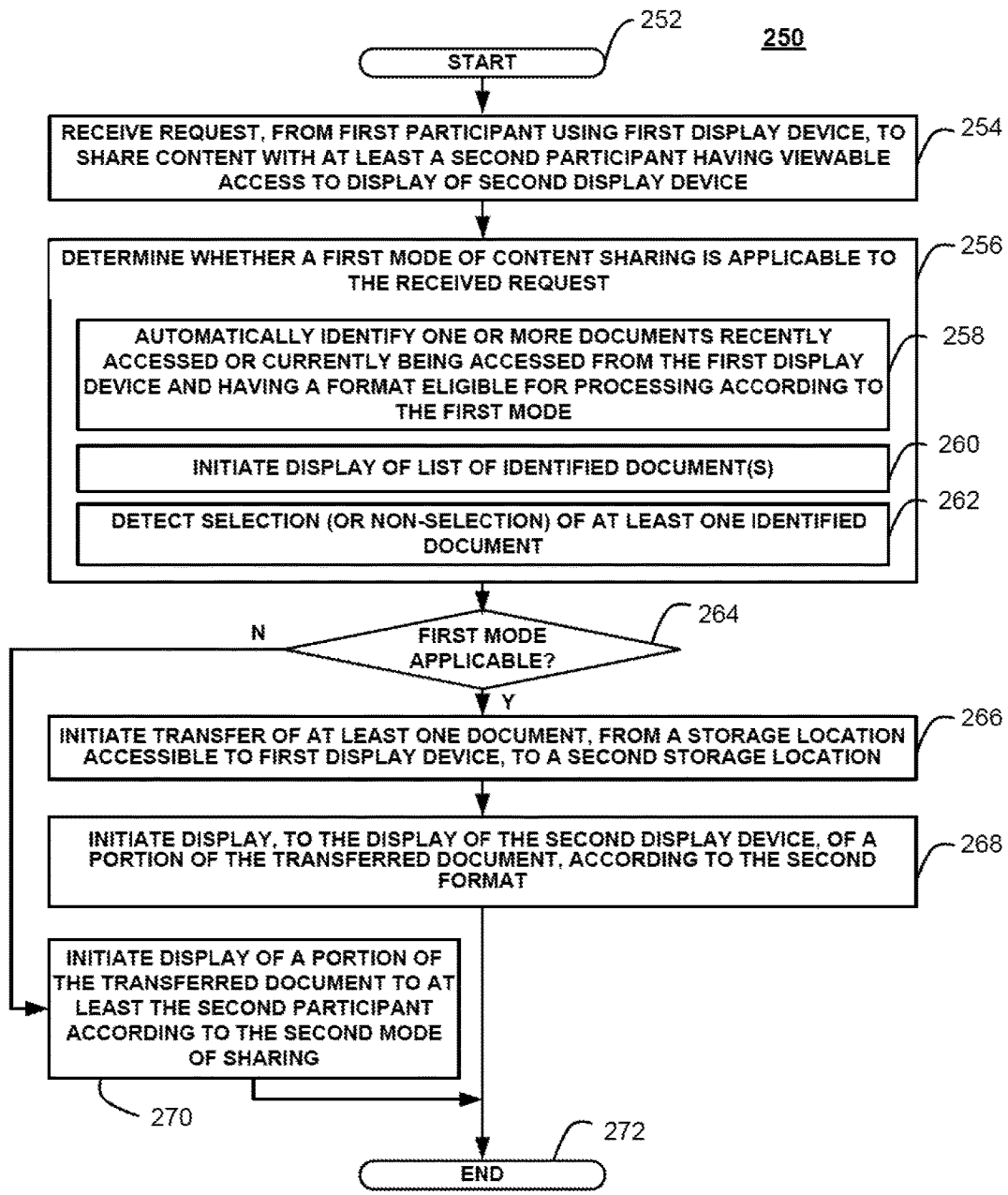
FIG. 2B depicts a flow diagram of a method for sharing viewable content with one or more participants in an online meeting or web conference, according to one or more embodiments.

At step 212, the method 200 converts the uploaded documents, or portions thereof, into a format usable by each of the client applications responsible for rendering the shared content for local display to a corresponding participant. The method then proceeds to step 214, at which point successive portions of the documents are transmitted according to the transmitted format for concurrent rendering to the displays of the meeting participants. FIG. 2B depicts a flow diagram of a method 250 for sharing viewable content with one or more participants in an online meeting or web conference, according to an embodiment. The method 250 is entered at step 252 and proceeds to step 254. At step 254, a first participant uses a first display device such, for example, as a desktop computer, laptop computer, notebook computer, a tablet computer, or a smart phone. By entry of input via the user interface of the first display device, the method processes a request by the first participant to make content viewable at the first participant's display available for display to one or more other participants. In some embodiments, the viewable content to be shared is stored in a local medium readable by the computer of the first participant. In other embodiments, the viewable content is stored at a remote storage location. The viewable content is rendered to the display of the first display device according to the operation of one or more locally executable applications.

The method 250 proceeds to step 256, where the method determines whether a first mode of content sharing is applicable to the request received at step 254. In an embodiment, the first mode is a document sharing mode, and step 256 includes a first sub-step 258, a second sub-step 260, and a third sub-step 262. At first sub-step 258, the method 250 automatically identifies one or more documents which have been recently accessed and/or are currently being accessed from the first display device. In an embodiment, the one or more documents are accessed by one of the applications being currently executed by a processor of the first display device.

In some embodiments, the first mode is a document sharing mode, by which documents stored in one of a plurality of supported ("applicable") formats are processed and converted into a format selected for sharing. By way of illustrative example, formats applicable to processing according to the document sharing mode can include one or more presentation document formats such as Microsoft® PowerPoint (*.ppt), one or more image formats such as the JPEG (*.jpg) format, or one or more word processing document formats such as Microsoft Word®. At sub-step 260, method 250 initiates the display of a list of those identified documents having one of the applicable formats. In some embodiments, a participant is given the opportunity to select one or more of the documents in the list and/or to browse a file directory to add any additional document(s) not pre-populated into the list by operation of sub-step 258. Step 256 of method 250 then proceeds to sub-step 262, wherein the method 250 detects whether a participant has selected any of the identified documents displayed to the participant for selection.

At step 264, the method 250 determines whether or not the first mode is applicable. If so, then the method 250 proceeds to step 266. At step 266, the method 250 initiates transfer of the selected document(s) from a storage location accessible to the first display device to a second storage location. The storage location accessible to the first display device can include a local hard drive, a removable media, or a remotely accessible storage location on a server. Likewise, the second storage location may include another storage location in the same local hard drive, removable media, or a remotely accessible location on the same or a different server. According to some embodiments, each transferred document is converted from its original format into an alternative format that consumes less bandwidth when being viewed by the other participant(s) as, for example, Adobe® Flash® (*.swf or *.flv). Such an arrangement is advantageous in that when all participants in a meeting or conference need to view the same page as is being rendered to the first display device, they need only receive a single extracted version of that page in the alternative format. Were this same page to be viewed in an application or desktop window sharing ("second") mode, it would be necessary to repetitively transmit data representative of that page view—as a stream of data for the entire duration that the page view is presented to the display(s) viewed by the other participants.

As such, sharing of viewable content according to the second mode consumes substantially more bandwidth than sharing of the very same content according to the first mode. Still further conservation of bandwidth is achieved, in accordance with the first sharing mode, when a previously shared document page view is revisited, since the former can be retained in a buffer local to the second display device (and any other display devices associated with other meeting participants) wherein the necessity for retransmission is entirely avoided.

Following conversion at step 266, the method 250 proceeds to step 268 where the method initiates display, to one or more display devices including the second display device, according to the alternative format as described above.

If, however, it is determined at step 264 that the first mode is not applicable (e.g., because no formats applicable to the first mode were identified or because the participant fails to select any such documents), then the method 250 proceeds to step 270. At step 270, the method 250 initiates display of a portion of the transferred document to at least the second participant according to the second mode of sharing. In accordance with this mode, as noted previously, it is necessary to send, to the other participants, a real-time view of the window or desktop being rendered to the display of one of the first display device. As already noted, this consumes a substantial amount of bandwidth and, under periods of high network utilization, may result in a very poor user experience.

The method 250 proceeds, from either of step 268 or 270, to terminating step 272 and ends.

Figure 3:
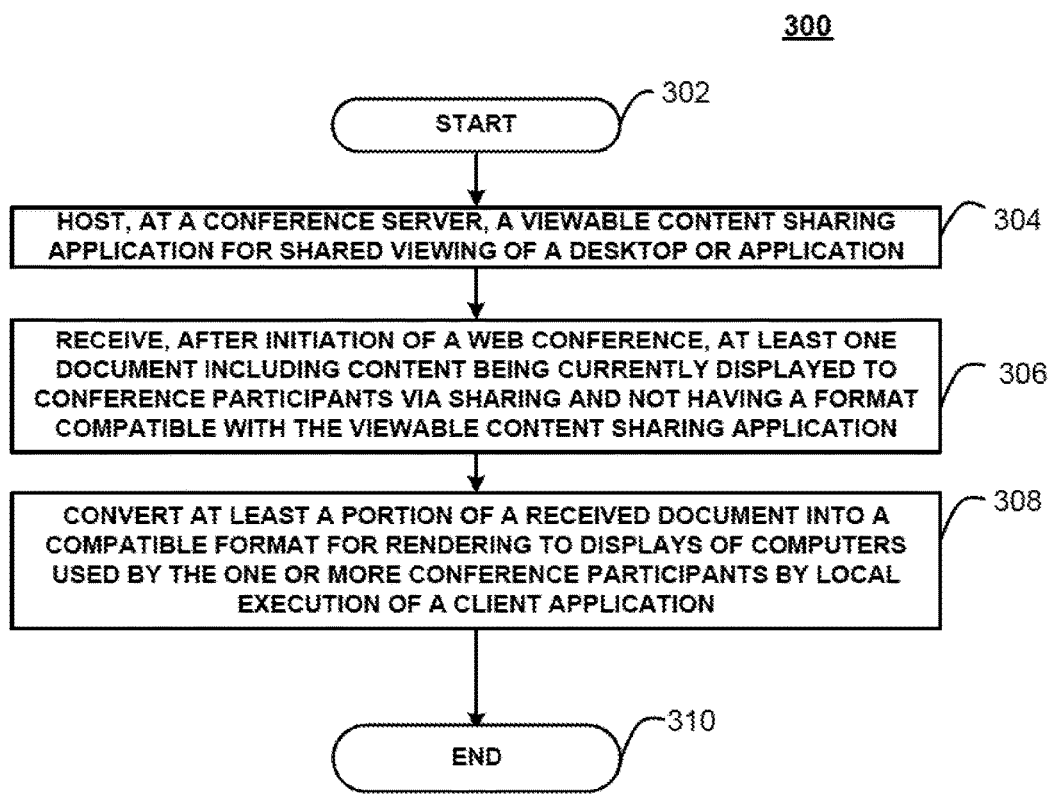
FIG. 3 depicts a flow diagram of a method for sharing viewable content with conference participants as performed by the system of FIG. 1, according to one or more embodiments.

FIG. 3 depicts a flowchart for a method 300 for sharing the contents of a presentation in a web conference according to an embodiment. The method is entered at step 302 and proceeds to step 304 where the method hosts, at a conference server, a viewable content sharing application for shared viewing of a desktop or application. The method 300 proceeds to step 306, where the method receives, after initiation of a web conference, at least one document. The received document includes content (e.g., one or more pages) being currently displayed to the conference host but is not in a format compatible with the viewable content sharing application. The method proceeds to step 308.

At step 308 the method converts at least a portion of the received document into a format compatible for rendering, to the displays of the computers used by the one or more conference participants, by execution of a local client application at each computer.

Figure 4A:
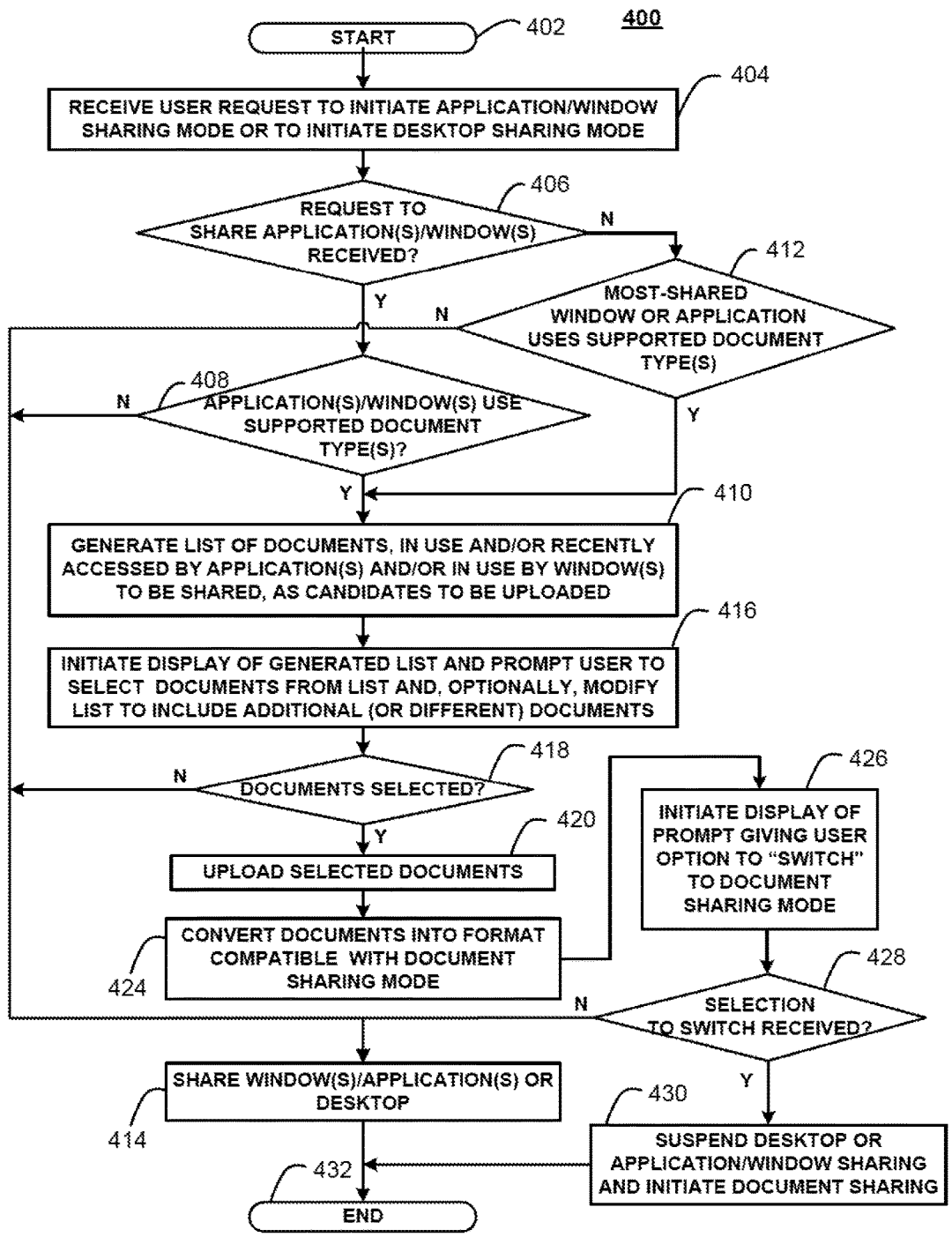
FIG. 4A depicts a flow diagram of a method for sharing viewable content according to an embodiment.

FIG. 4A depicts a flow diagram of a method 400 for sharing viewable content according to an embodiment. Method 400 is entered at step 402 and proceeds to step 404, where the method receives a user request to initiate an application sharing mode, a window sharing mode, or a desktop sharing mode. The method 400 proceeds to step 406 wherein it is determined whether a request to share an application, desktop or window has been received. If so, the process proceeds to step 408, wherein the method 400 next determines whether the applications or windows require use of one or more supported document types. By way of illustrative example, a user may have launched Microsoft PowerPoint, Microsoft Word, and Microsoft Excel, as well as a drafting application such, for example, as Microsoft Visio. In such an event, then the first three applications may be identified at step 408 as applications using a supported document type (*.ppt, *.docx, *.xls), while those documents with a *.vsd extension are not supported.

From step 408, the method 400 proceeds to step 410 in the event that an application does use a supported document type. At step 410, the method generates a list of documents in use and/or recently accessed by applications and/or in use by window(s) to be shared, as candidates to be uploaded and processed. If, at step 406, a request to share an application or window was not received, method 400 proceeds to step 412, wherein the method identifies the most-shared window or application and determines whether this application or window uses a supported document type. If so, then method 400 proceeds to step 410 as previously described and generates a list of documents used by the most-shared window or application.

From step 410 the method 400 proceeds to step 416 and initiates display of the generated list and prompts the user to select documents from the list and, optionally, to modify the list to include additional (or different) documents. The method 400 then proceeds to step 418.

At step 418, method 400 determines whether documents were selected from among those displayed in the list generated at step 416. If so, then the method proceeds to step 420 and uploads them to a server. The method 400 then proceeds to step 424, wherein a conversion is performed into a format compatible with the document sharing mode. In an embodiment, the conversion is performed at the server after uploading has been performed. In an alternate embodiment, the conversion is performed first and then the document is uploaded in the converted format.

Once the uploading and conversion is complete, and a meeting in which the uploaded document is to be shared, the user is given the option, at step 426, of "switching" to a document sharing mode. If method 400 receives the election to switch, then the desktop or application/window sharing mode is suspended at step 430 and the meeting continues in the document sharing mode unless and until the user elects to return to the application/window or desktop sharing mode. When no more content is left to be shared, the method 400 terminates at 432.

If no documents are identified at step 408 or 412, no documents are selected at step 418, or no election to switch is received at step 428, then the method proceeds to step 414, wherein the higher-bandwidth consuming window/application or desktop view sharing operation is instead performed until no further content is to be shared. The method then terminates at step 432.

Figure 4B:
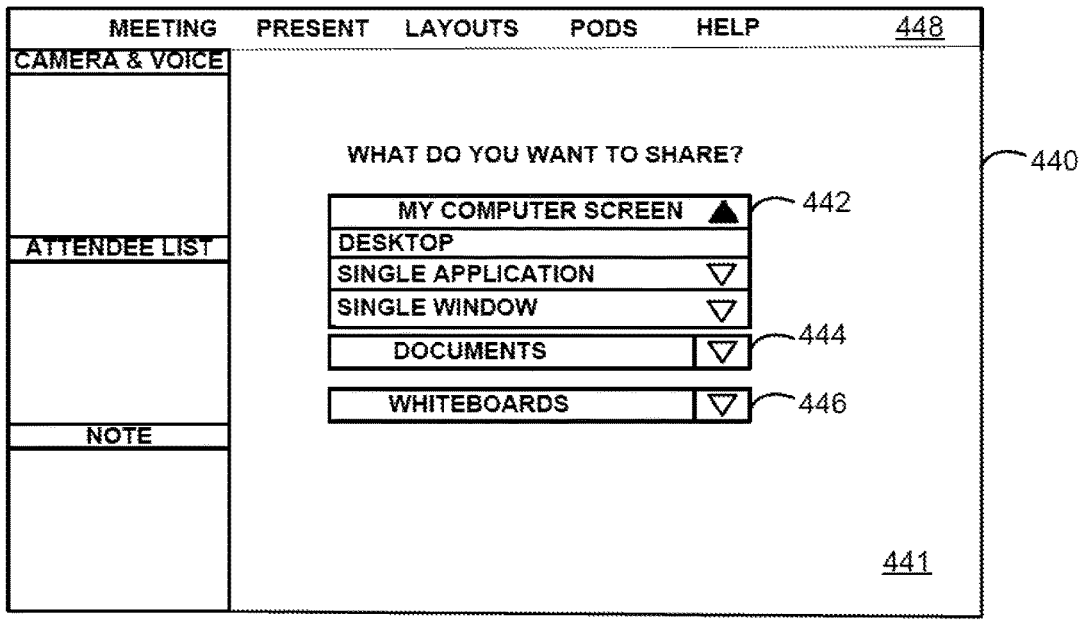
FIGS. 4B-4E depict screenshots of a user interface exemplifying the implementation of the embodiment of FIG. 4A.

FIGS. 4B-4E depicts screenshots of a user interface 441 exemplifying the implementation of the embodiment of FIG. 4A. In FIG. 4B, the user is presented with a display 440 that prompts the user to indicate (by dropping down from item 442) whether he or she wishes to share a view of his or her entire desktop, a single application, a single window, one or more documents from a drop down item 444, or a whiteboard by dropping down from 446.

Figure 4C:
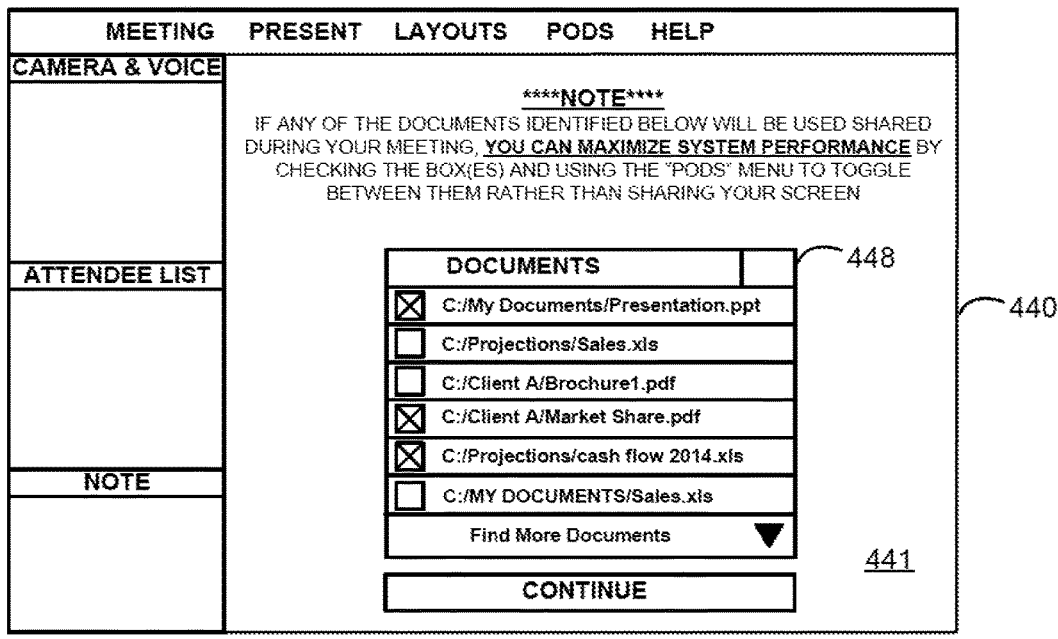
Figure 4D:
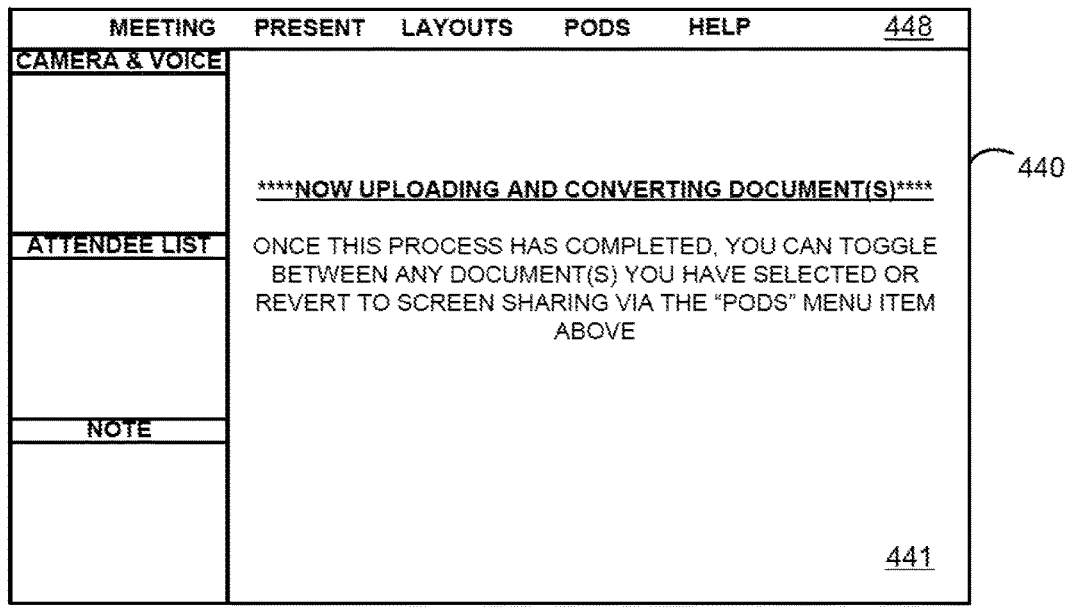
Figure 4E:
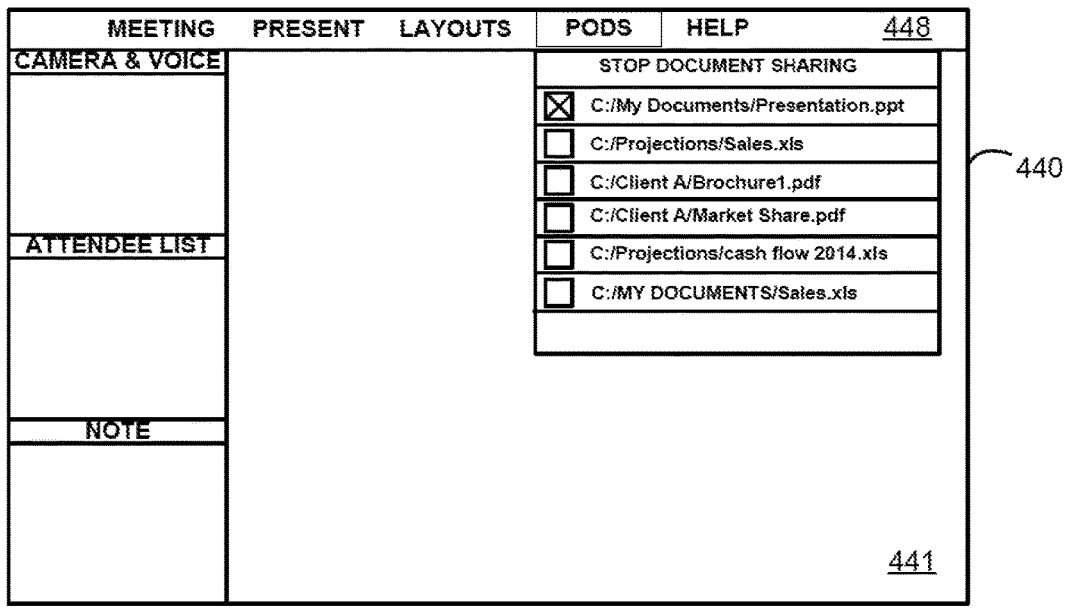

As seen in FIG. 4C, if the user clicks on item 444, an automatically pre-populated list of files in use and/or recently used by one or more actively running applications is displayed in user interface 441. By checking the appropriate boxes, the user is reserving the ability to utilizing a document sharing mode. In some embodiments, this ability is reserved even if the user has initially indicated a desire to use application/window or desktop sharing. In FIG. 4D the user is notified that an uploading and conversion process is being performed. Finally, in FIG. 4E, the user is given the option of selecting any one of the uploaded documents selected via the interface shown in FIG. 4B. Alternatively, the user may elect at any time to "Stop Document Sharing" by an appropriate click or other data entry gesture.

Figure 5A:
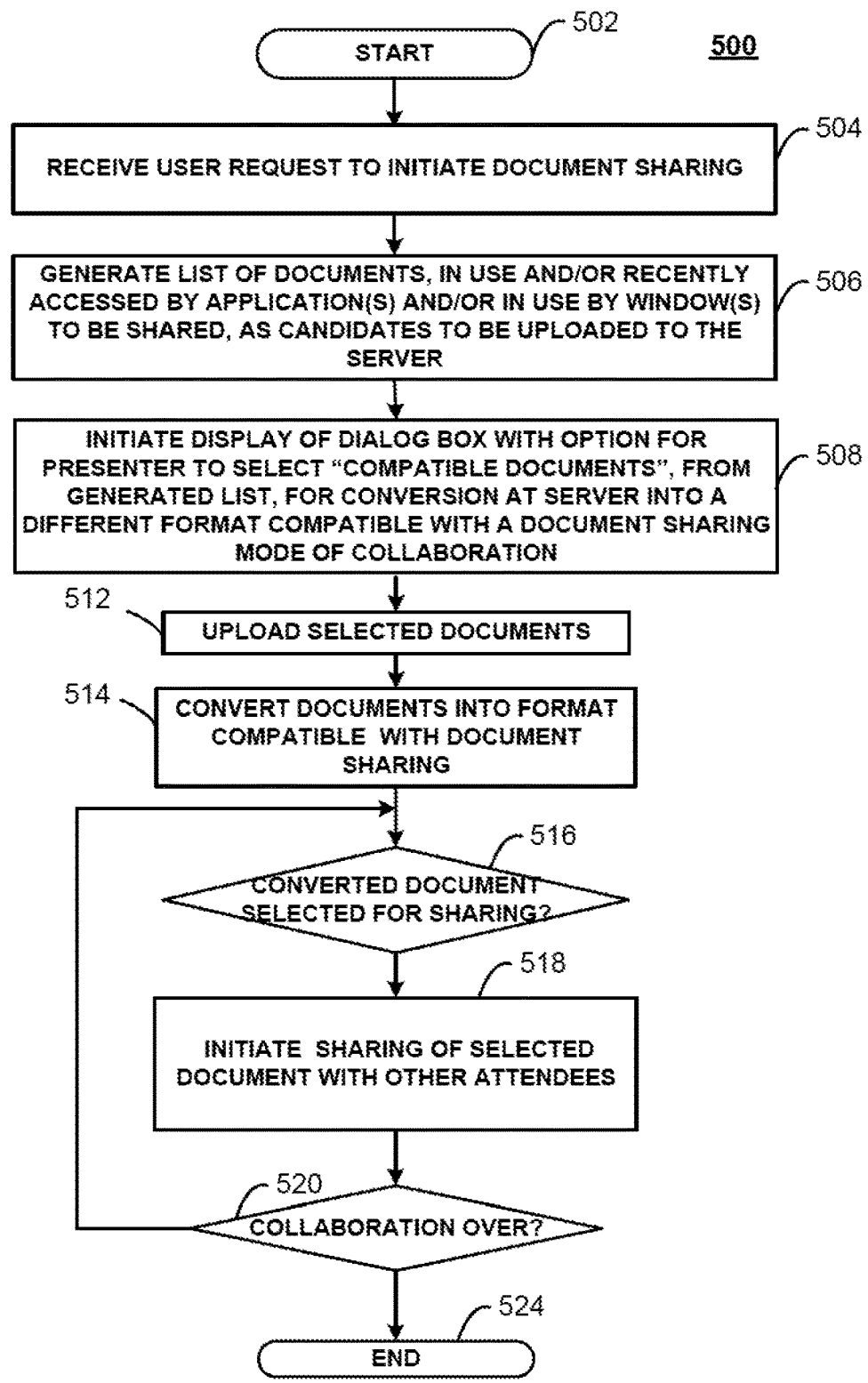
FIG. 5A depicts a flow diagram of a method for sharing viewable content according to an embodiment.

FIG. 5A depicts a flow diagram of a method for sharing viewable content according to an embodiment. Method 500 is entered at step 502 and proceeds to step 504, where the method receives a user request to initiate a document sharing mode. By way of alternative example, the user may further be permitted to request a window sharing mode, or a desktop sharing mode. The method 500 proceeds to step 506 wherein the method generates a list of documents in use and/or recently accessed by applications and/or in use by window(s) to be shared, as candidates to be uploaded and processed. From step 506, the method 500 proceeds to step 508 and initiates display of the generated list and prompts the user to select documents from the list and, optionally, to modify the list to include additional (or different) documents. The method 500 then proceeds to step 512.

Where additional modes other than document sharing are contemplated, the method may optionally determines whether documents were selected from among those displayed in the list generated at step 508 and, if not proceed according to the an application/window or desktop viewing mode (not shown. In the present embodiment, however, the method proceeds to step 512 and uploads the selected document(s) to a server. The method 500 then proceeds to step 514, wherein a conversion is performed into a format compatible with the document sharing mode.

Once the uploading and conversion is complete, and a meeting in which the uploaded document is to be shared, at step 516 the user selects a converted document for sharing. When method 500 receives the initial selection, then the meeting proceeds in a bandwidth-conserving document sharing mode unless and until the user elects to return to the application/window or desktop sharing mode (or the sharing terminates). In the exemplary embodiment of FIG. 5A, the user selects one uploaded document at a time from among those uploaded at step 512. When it is determined at step 520 that no more content is left to be shared, the method 500 terminates at 524.

Figure 5B:
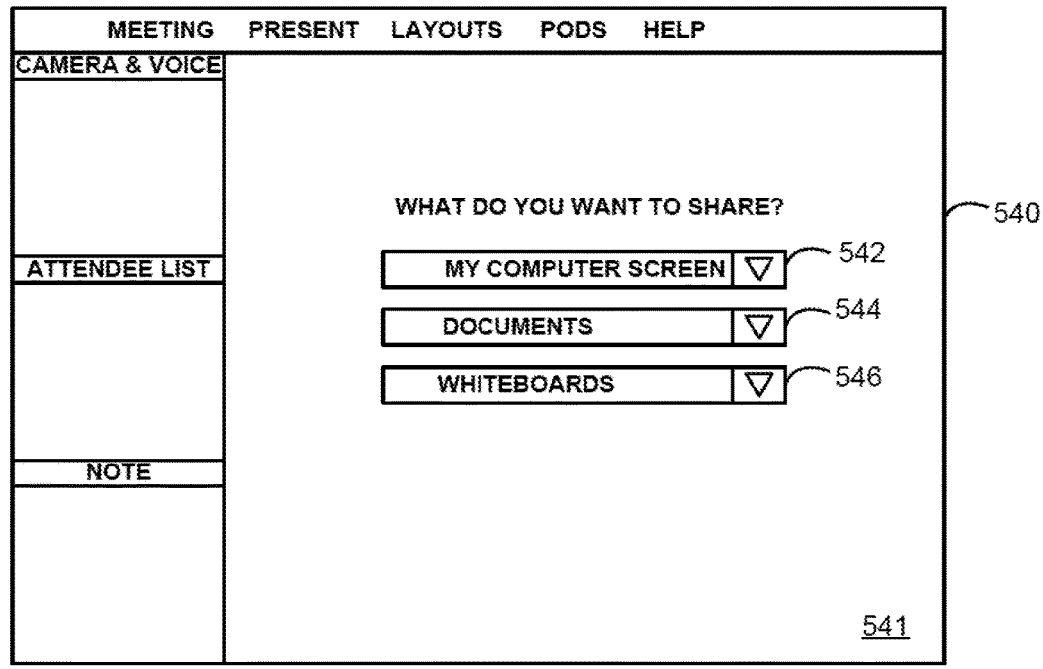

FIGS. 5B-5G depicts a flow diagram of a method for sharing viewable content according to the embodiment of FIG. 5A. In FIG. 5B, the user is presented with a display 540 and user interface 541 that prompts the user to indicate whether he or she wishes to share a view of his or her entire computer screen (drop down menu item 542), one or more documents (from drop down item 544), or a whiteboard (drop down menu item 546).

Figure 5C:
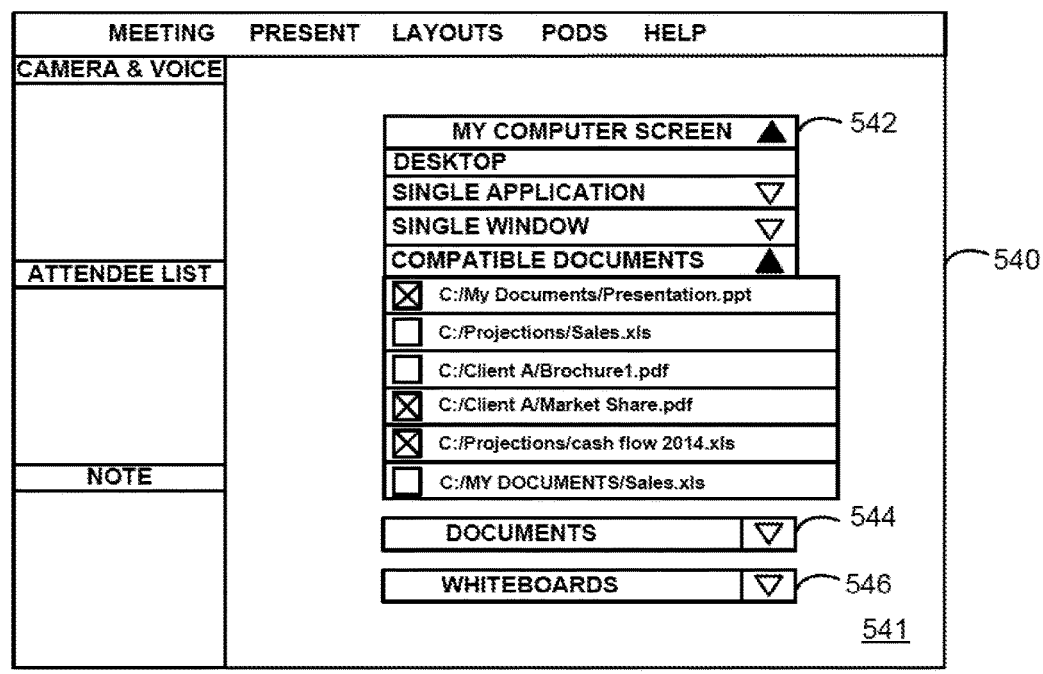

As seen in FIG. 5C, if the user clicks on item 544, an automatically pre-populated list of files in use and/or recently used by one or more actively running applications is displayed in user interface 541. By checking the appropriate boxes, the user is reserving the ability to utilizing a document sharing mode. In some embodiments, this ability is reserved even if the user previously or additionally indicates a desire to use application/window or desktop sharing. FIGS. 5D and 5E depict, respectively, the page view 550*a* seen by the party who selected the document "Market Share.pdf" in the role of presenter, and page view 550*b* as seen by one or more participants in which the document (or portion thereof) is being shared.

Figure 5F:
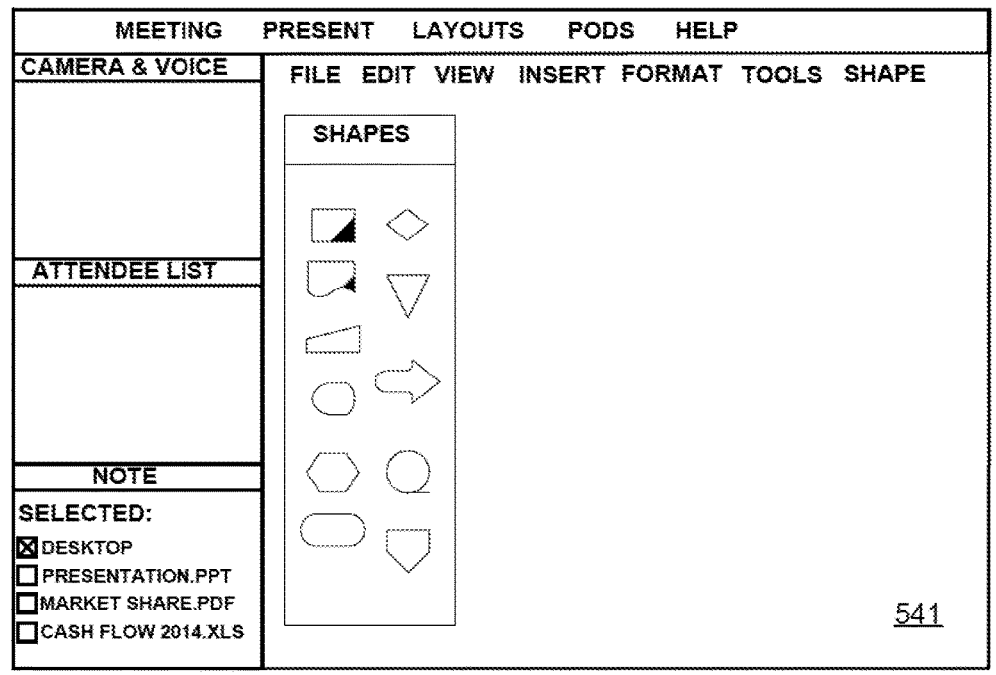
Figure 5G:
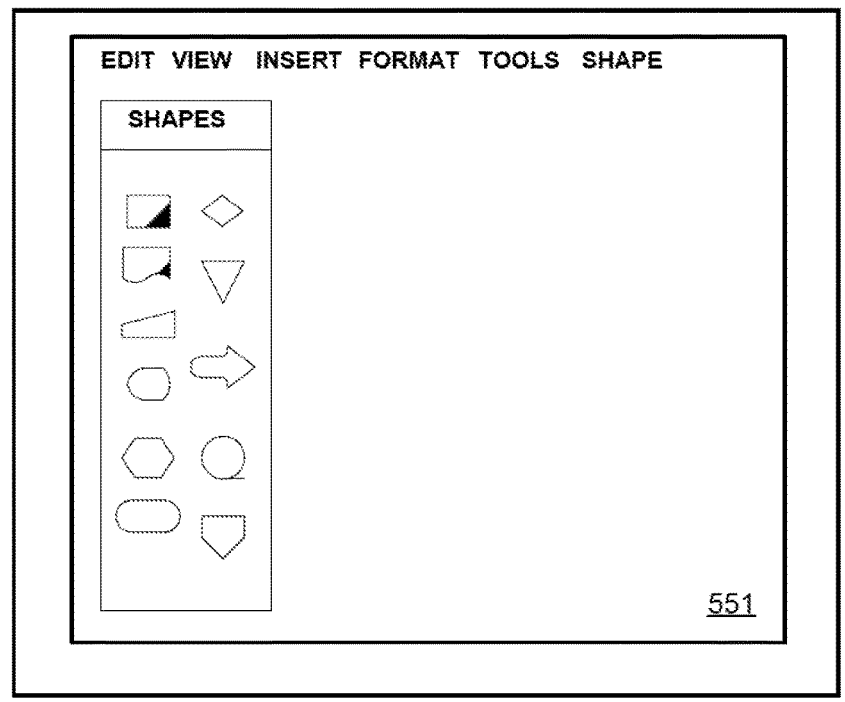

Likewise, FIGS. 5F and 5G depict, respectively, displayed view 541 seen by the party who elected to share the desktop screen view of a first display device (e.g., in the role of presenter), and the view 551 as seen by one or more participants. In this case, the document is in a non-supported format such as the "VSD" file format used by Microsoft Visio. In some embodiments, the user may be prompted with a further option to convert a non-supported format with one that is supported. By way of example, if the user were first to save or print the Visio document into a format that is supported, then the thus converted document could be uploaded and further converted in the same manner as previously described.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving a request to transmit a view of a screen of a first client device to a second client device, the first client device associated with a first participant and the second client device associated with a second participant;
based on a response from the second client device, transmitting the view of the screen of the first client device to the second client device;
automatically determining whether content from the view of the screen of the first client device being transmitted to the second client device comprises one or more documents stored on the first client device; and
based on automatically determining that the content from the view of the screen of the first client device being transmitted to the second client device comprises one or more documents stored on the first client device, transferring, separate from the transmitting, a copy of at least one document of the one or more documents stored on the first client device to the second client device, wherein transferring the copy of the at least one document comprises providing a page view of the at least one document for display on the second client device, the page view corresponding to a same page being rendered on the screen of the first client device and being extracted from the at least one document.

2. The method according to claim 1, wherein the one or more documents comprise one or more documents recently accessed or currently being accessed by the first client device and having a format compatible with transferring for display on the second client device, the method further comprising:
before transferring the copy of the at least one document of the one or more documents stored on the first client device to the second client device, providing for display on the first client device a list of the one or more documents recently accessed or currently being accessed by the first client device and having the format compatible with transferring for display on the second client device.

3. The method according to claim 2, further comprising, before transferring the copy of the at least one document of the one or more documents stored on the first client device to the second client device, receiving a selection, from the first participant, of the at least one document from the list.

4. The method according to claim 3, wherein transferring the copy of the at least one document of the one or more documents stored on the first client device to the second client device comprises:
transferring a copy of the selected at least one document from the first client device to a storage location accessible to the second client device.

5. The method according to claim 4, further comprising:
extracting a page from the transferred copy of the at least one document;
converting the extracted page into a format compatible with displaying the extracted page on the second client device; and
transferring the converted page for display on the second client device.

6. The method according to claim 2, wherein providing for display on the first client device the list of the one or more documents is performed in response to transmitting the view of the screen of the first client device to the second client device.

7. The method according to claim 6, wherein
providing the page view of the at least one document comprises providing the page view of the at least one document selected from the list for display on the second client device.

8. The method of claim 7, wherein automatically determining whether content from the view of the screen of the first client device being transmitted to the second client device comprises one or more documents stored on the first client device comprises:
detecting execution of at least one application capable of accessing documents having the format compatible with transferring for display on the second client device; and
identifying the at least one document, having the format compatible with transferring for display on the second client device, concurrently executing with the detected execution of the at least one application.

9. The method according to claim 8, wherein automatically determining whether content from the view of the screen of the first client device being transmitted to the second client device comprises one or more documents stored on the first client device comprises:
receiving an indication that the identified at least one document is associated with a web conference.

10. A system comprising:
at least one processor; and
at least one non-transitory computer readable storage medium storing instructions that, when executed by the at least one processor, cause the system to:
receive a request to transmit a view of a screen of a first client device to a second client device, the first client device associated with a first participant and the second client device associated with a second participant;
based on a response from the second client device, transmit the view of the screen of the first client device to the second client device;
automatically determine whether content from the view of the screen of the first client device being transmitted to the second client device comprises one or more documents stored on the first client device; and based on a determination that the content from the view of the screen of the first client device being transmitted to the second client device comprises one or more documents stored on the first client device, transfer, separate from the transmitting, a copy of at least one document of the one or more documents stored on the first client device to the second client device, wherein transferring the copy of the at least one document comprises providing a page view of the at least one document for display on the second client device, the page view corresponding to a same page being rendered on the screen of the first client device and being extracted from the at least one document.

11. The system of claim 10, wherein the one or more documents comprise one or more documents recently accessed or currently being accessed by the first client device and having a format compatible with transferring for display on the second client device, the system further comprising instructions that, when executed by the at least one processor, cause the system to:
before transferring the copy of the at least one document of the one or more documents stored on the first client device to the second client device, provide for display on the first client device a list of the one or more documents recently accessed or currently being accessed by the first client device and having the format compatible with transferring for display on the second client device.

12. The system according to claim 11, further comprising instructions that, when executed by the at least one processor, cause the system to provide for display on the first client device the list of the one or more documents in response to transmitting the view of the screen of the first client device to the second client device.

13. The system according to claim 12, further comprising instructions that, when executed by the at least one processor, cause the system to, before transferring the copy of the at least one document of the one or more documents stored on the first client device to the second client device, receive a selection, from the first participant, of at least one document from the list.

14. The system according to claim 13, further comprising instructions that, when executed by the at least one processor, cause the system to transfer the at least one document for display on the second client device by transferring a copy of the selected at least one document from the first client device to a storage location accessible to the second client device.

15. A non-transitory computer readable medium for storing instructions thereon that, when executed by at least one processor, cause a computer system to perform a method of performing desktop view, application view, and document view sharing comprising:
receiving a request to transmit a view of a screen of a first client device to a second client device, the first client device associated with a first participant and the second client device associated with a second participant;
based on a response from the second client device, transmitting the view of the screen of the first client device to the second client device;
automatically determining whether content from the view of the screen of the first client device being transmitted to the second client device comprises one or more documents stored on the first client device, wherein the one or more documents have been recently accessed or are currently being accessed by the first client device and have a format compatible with transferring for display on the second client device; and
based on automatically determining that the content from the view of the screen of the first client device being transmitted to the second client device comprises one or more documents stored on the first client device, transferring, separate from the transmitting, a copy of at least one document of the one or more documents stored on the first client device to the second client device, wherein transferring the copy of the at least one document comprises providing a page view of the at least one document for display on the second client device, the page view corresponding to a same page being rendered on the screen of the first client device and being extracted from the at least one document.

16. The non-transitory computer readable medium according to claim 15, further comprising instructions that, when executed by the at least one processor, cause the computer system to perform steps comprising:
before transferring the copy of the at least one document of the one or more documents stored on the first client device to the second client device, providing for display on the first client device a list of the one or more documents stored on the first client device; and
receiving a selection from the first participant of the at least one document from the list of the one or more documents stored on the first client device;
wherein transferring the copy of the at least one document of the one or more documents stored on the first client device to the second client device comprises transferring a copy of the selected at least one document of the one or more documents stored on the first client device to the second client device in response to receiving the selection from the first participant of the at least one document.

17. The non-transitory computer readable medium according to claim 16, wherein transferring the copy of the selected at least one document of the one or more documents stored on the first client device to the second client device comprises transferring the selected at least one document from the first client device to a storage location accessible to the second client device.

18. The non-transitory computer readable medium according to claim 17, further comprising instructions that, when executed by the at least one processor, cause the computer system to perform steps comprising:
extracting a page from the transferred copy of the at least one document;
converting the extracted page into a format compatible with displaying the extracted page on the second client device; and
transferring the converted page for display on the second client device.

19. The non-transitory computer readable medium according to claim 16, wherein providing for display on the first client device the list of the one or more documents stored on the first client device is performed in response to transmitting the view of the screen of the first client device to the second client device.

20. The non-transitory computer readable medium according to claim 19, wherein
providing the page view of the at least one document comprises providing the page view of the at least one document selected from the list for display on the second client device.

* * * * *